United States Patent
Kosak

(10) Patent No.: US 6,742,808 B1
(45) Date of Patent: Jun. 1, 2004

(54) CAST ALUMINUM VEHICLE SUBFRAME WITH TENSION/COMPRESSION STRUTS

(75) Inventor: Werner E. Kosak, Brighton, MI (US)

(73) Assignee: Hayes Lemmerz International, Inc., Northville, MI (US)

( * ) Notice: Subject to any disclaimer, the term of this patent is extended or adjusted under 35 U.S.C. 154(b) by 204 days.

(21) Appl. No.: 10/006,185

(22) Filed: Dec. 10, 2001

(51) Int. Cl.[7] .............................................. B62D 24/00
(52) U.S. Cl. ........................ 280/781; 280/784; 280/785; 280/795
(58) Field of Search ................................ 280/781, 784, 280/785, 795, 796, 798, 800, 124.109; 296/204, 203.1

(56) References Cited

U.S. PATENT DOCUMENTS

| | | | |
|---|---|---|---|
| 4,623,167 A | * 11/1986 | Matsubayashi et al. | ..... 280/798 |
| 4,852,678 A | * 8/1989 | Yamaguchi | ................. 180/219 |
| 5,244,053 A | 9/1993 | Kashiwagi | |
| 5,280,957 A | 1/1994 | Hentschel et al. | |
| 5,547,224 A | 8/1996 | Kami et al. | |
| 5,556,133 A | 9/1996 | Oku et al. | |
| 5,601,304 A | 2/1997 | Tilly et al. | |
| 5,660,428 A | * 8/1997 | Catlin | ......................... 296/205 |
| 5,700,033 A | * 12/1997 | Beckman | ..................... 280/795 |
| 5,897,139 A | 4/1999 | Aloe et al. | |
| 5,915,727 A | 6/1999 | Bonnville | |
| 6,003,897 A | 12/1999 | Dostert et al. | |
| 6,003,898 A | * 12/1999 | Teply et al. | ................. 280/785 |
| 6,047,988 A | 4/2000 | Aloe et al. | |
| 6,193,273 B1 | 2/2001 | Novak et al. | |
| 6,439,608 B1 | * 8/2002 | Bonnville | ..................... 280/796 |
| 6,511,096 B1 | * 1/2003 | Kunert et al. | ............... 280/785 |
| 6,648,351 B1 | * 11/2003 | Kosak | .................. 280/124.109 |

FOREIGN PATENT DOCUMENTS

DE          199 22 800          11/1999

* cited by examiner

Primary Examiner—Paul N. Dickson
Assistant Examiner—Toan C To
(74) Attorney, Agent, or Firm—MacMillan, Sobanski & Todd, LLC

(57) ABSTRACT

An integrally cast aluminum subframe for a vehicle suspension system has increased stiffness for an overall vehicle frame while minimizing the thickness of the main aluminum casting by using tension/compression struts to resist flexing. Various strut attachments are shown that simplify manufacturing and lower the cost. The invention results in further improvement of weight reduction while simultaneously achieving a desired amount of stiffness.

22 Claims, 4 Drawing Sheets

CAST ALUMINUM VEHICLE SUBFRAME WITH TENSION/COMPRESSION STRUTS

BACKGROUND OF THE INVENTION

This application is related to co-pending application U.S. Ser. No. 10/006,327, filed concurrently herewith.

The present invention relates in general to a rear subframe for a multi-link vehicle suspension, and, more specifically, to increasing stiffness of the subframe using tension/compression struts.

The vehicle frame supports the vehicle body and, together with other components, such as control arms, springs, and shock absorbers, comprises the suspension system which permits up and down wheel movement without up and down movement of the body. Due to the many forces to which the frame is subjected, it is important that the frame have high stiffness for purposes of structural integrity, vehicle geometry, and creation of noise.

The vast majority of vehicle frames have been fabricated from steel because of its high strength, high stiffness, and reasonable cost. However, there are also concerns for minimizing the weight of a frame, based mainly on a desire to improve fuel economy.

Integral castings of aluminum or aluminum alloys may be used as vehicle frames or more typically subframes, cradles, and cross members (i.e., frame sections). Aluminum is able to provide good stiffness and can provide a significant reduction in weight. A hollow cross section (e.g., box or tubular) of the subframe members is used to further improve stiffness and reduce weight.

Although the characteristic stiffness of aluminum or aluminum alloy is good, the e-module or longitudinal stiffness is about three times less than it is for steel. Therefore, the aluminum casting has to maintain a certain thickness in order to maintain sufficient stiffness, thus limiting the amount of weight reduction that could be obtained in the prior art.

SUMMARY OF THE INVENTION

The present invention has the advantage of increased stiffness of a vehicle frame while minimizing the thickness of the main aluminum casting, resulting in further improvement of weight reduction while simultaneously achieving a desired amount of stiffness.

In one aspect of the present invention, a frame apparatus for a vehicle comprises an aluminum subframe including a substantially hollow left side-rail, a substantially hollow right side-rail, a front cross-member, a rear cross-member, a left-side upper control arm attachment, a left-side lower control arm attachment, a right-side upper control arm attachment, and a right-side lower control arm attachment. The substantially hollow side-rails and cross-members each has a respective cross-sectional diameter over a majority of their respective lengths about equal to a first predetermined diameter. A tension/compression strut element has a first end and a second end, the first and second ends being affixed between a first locus and a second locus on the cast aluminum subframe. The tension/compression strut element has a substantially straight body between the first and second ends and has a respective cross-sectional diameter over a majority of its substantially straight body about equal to a second predetermined diameter, the second predetermined diameter being less than about one-half of the first predetermined diameter.

DETAILED DESCRIPTION OF PREFERRED EMBODIMENTS

Figure 1:
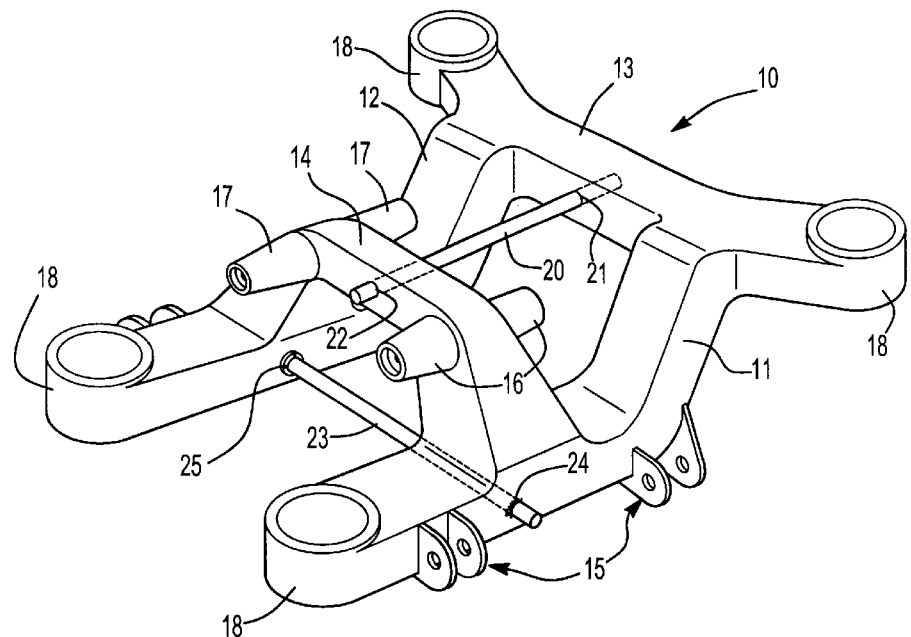
FIG. 1 is a perspective view of one preferred embodiment of a subframe according to the present invention.

Referring to FIG. 1, a cast aluminum subframe 10 includes a left side-rail 11, right side-rail 12, rear cross-member 13, and front cross-member 14. Bosses 18 located at each corner of subframe 10 provide connection points to the vehicle body and/or to other frame components.

Subframe 10 also includes a left lower control arm connection 15 in the form of two clevis arrangements, one for each link of the control arm (not shown). A left upper control arm connection 16 and a right upper control arm connection 17 utilize in this one example mounting studs as described in copending U.S. application Ser. No. 10/006, 327.

The present invention supplements the stiffness of cast subframe 10 with strategically located tension/compression struts. Specifically, for any undesirable flexibility present in the subframe, the struts are affixed rigidly between a first locus on the subframe and a second locus on the subframe such that flexing would tend to stretch or compress the strut so that the flexing motion is opposed by the strut. In order to avoid the addition of significant weight, each strut has a cross-sectional diameter or width that is less than about one-half of the cross-sectional diameter or width of the side-rails or cross-members of the main casting. Due to the size and added structural complexity that would result to the subframe, one preferred embodiment of the present invention does not form the struts integrally as part of the main casting. Instead, the struts are formed separately and then one or more struts are affixed between respective locus points where needed.

As shown in FIG. 1, a strut 20 extends between a first locus 21 on rear cross-member 13 and a second locus 22 on front cross-member 14. An attachment structure such as a hole, passage, threaded receptacle, or clamp may preferably be located at each locus. Strut attachment may be achieved in a variety of ways including bolting, riveting, welding, clamping, mechanical locking, screwing, and other ways known to those skilled in the art. The strut itself may be formed of metallic material by stamping, forging, casting, and extruding, etc. Preferred materials for the strut include aluminum, aluminum alloys, and steel. The strut may be a solid rod or a hollow tube, for example.

Figure 9:
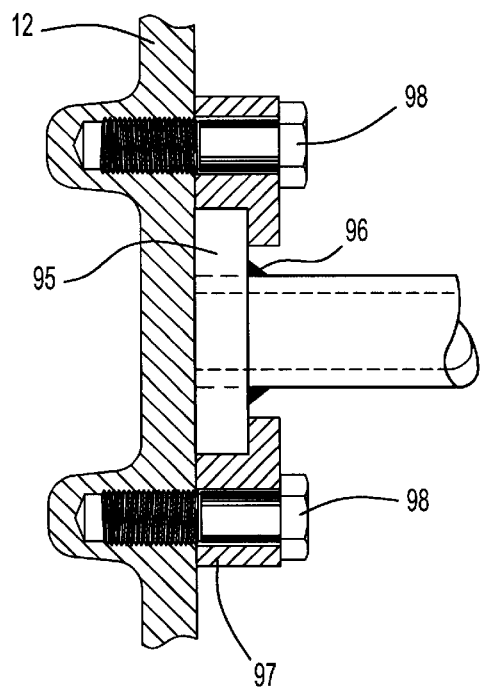
FIG. 9 is a partially cutaway, side cross-section of a mechanical lock for rigidly retaining a strut.

A strut 23 is affixed between side-rails 11 and 12. A weld 24 affixes strut 23 at one locus and a mechanical lock or clamp 25 affixes strut 23 at the other locus. One non-limiting example of a mechanical lock is shown in greater detail in FIG. 9. Strut 23 has a collar or disk 95 attached to its end by a weld 96, for example. A cover 97 has an inner recess sized for retaining collar 95 and has a central opening through which strut 23 passes. Cover 97 is bolted to side-rail 12 by bolts 98 in order to rigidly retain strut 23.

Figure 2:
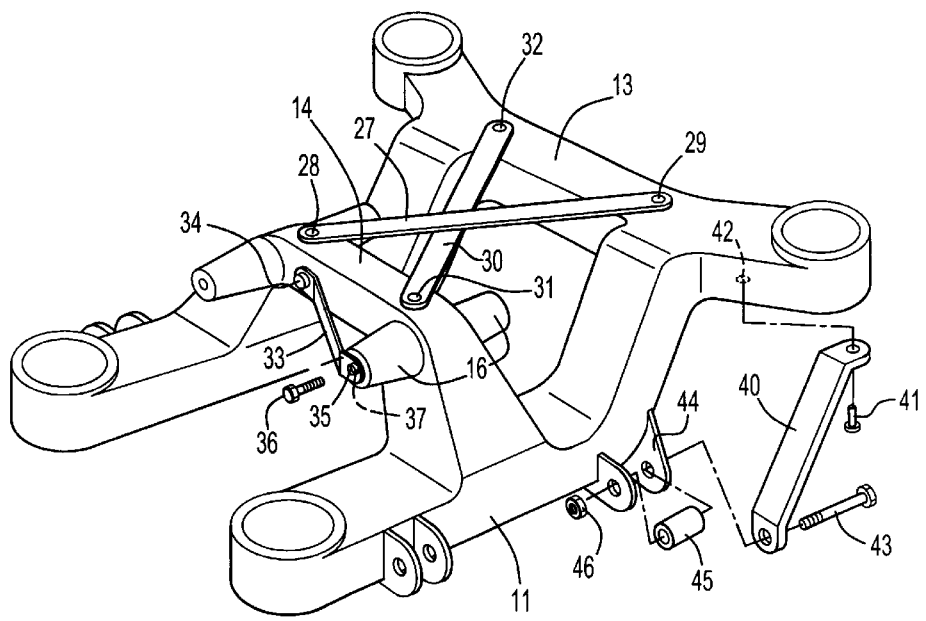
FIG. 2 is a perspective view of another embodiment of a subframe according to the present invention.

FIG. 2 shows additional embodiments for the struts. A strut 27 is affixed to front cross-member 14 by a rivet 28 at one locus and to rear cross-member 13 by a rivet 29 at a second locus. Another strut 30 is affixed to front cross-member 14 by a rivet 31 at one locus and to rear cross-member 13 by a rivet 32 at a second locus. Struts 27 and 30 cross each other to brace the subframe in a transverse direction.

Stiffness may also be added to the control arm connecting structures. Thus, a strut 33 is connected at one end by a rivet 34 to one locus on front cross-member 14. The other end of strut 33 includes a bolt-hole 35 and is connected by a bolt 36 to a second locus at a mounting stud 37 of left upper control arm connection 16. Preferably, a bushing for the link of an upper control arm would also be retained by bolt 36, but this is not shown.

A strut 40 is connected at one end by a rivet 41 to a hole 42 located at a first locus. The second end of strut 40 is connected to a second locus, which is at a clevis flange 44 of the left lower control arm connection. A bolt 43 couples strut 40 with the clevis and a bushing 45 of a lower control arm articulation. A nut 46 secures bolt 43.

Figure 3:
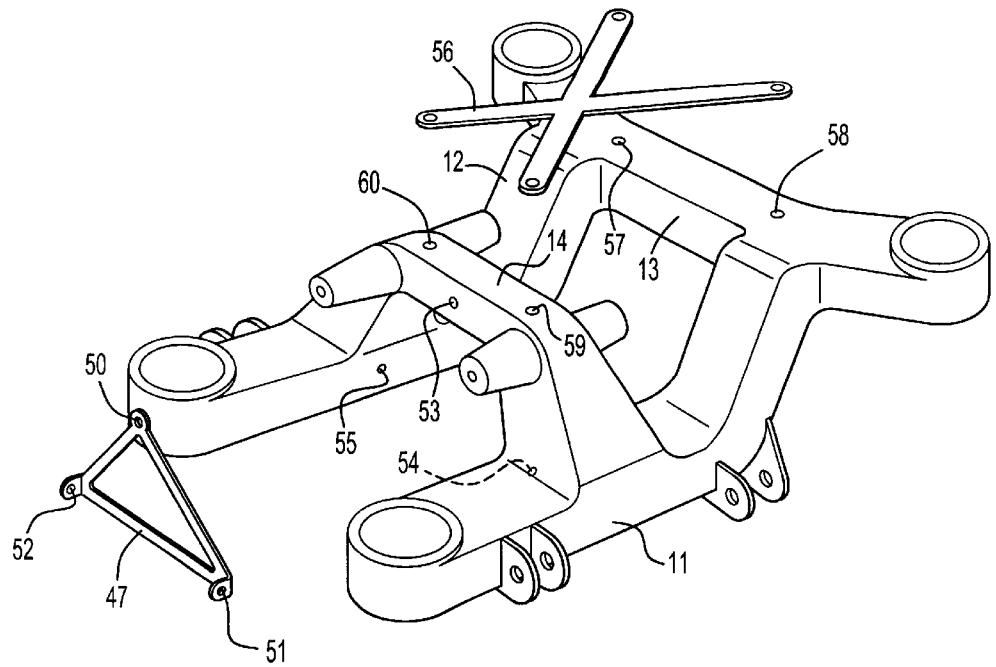
FIG. 3 is a perspective view of yet another embodiment of a subframe according to the present invention.

Multi-piece struts are also contemplated by the present invention as shown in FIG. 3. A triangular multi-strut 47 has vertices 50, 51, and 52, each with a respective connection hole and each connected to a respective locus 53, 54, and 55 by a screw or bolt (not shown). Since multi-strut 47 includes straight body portions between each pair of vertices, it functions at a tension/compression strut between each pair of loci.

An x-shaped multi-strut 56 has four strut ends, each connected to a respective locus 57, 58, 59, and 60.

Figure 4:
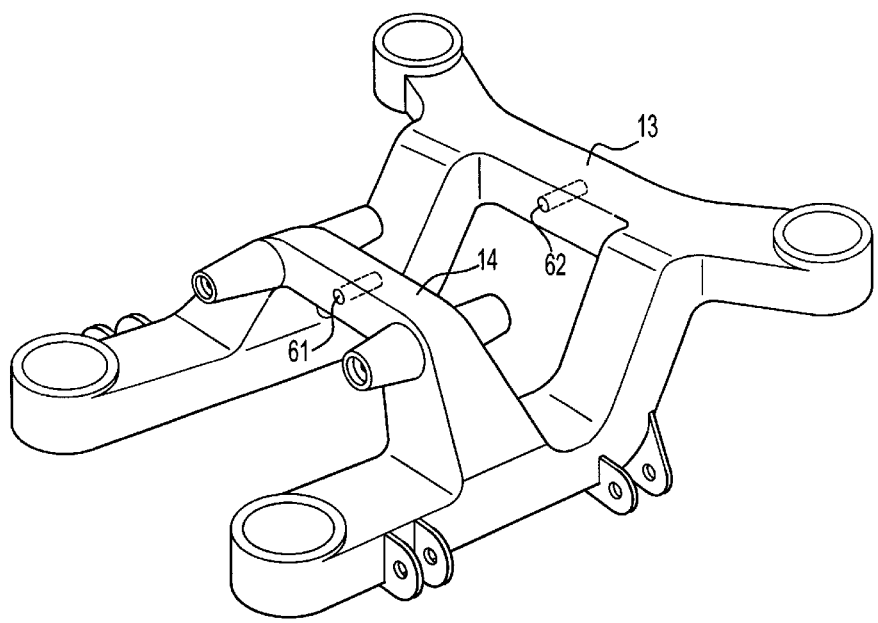
FIG. 4 is a perspective view showing passages in the cross-members for receiving a strut.

FIG. 4 illustrates a preferred strut attachment method of the present invention. The side-rails and cross-members of the cast subframe have hollow cross sections. Passages 61 and 62 are integrally cast and are coaxially aligned so that a straight strut can be inserted through one passage and into the other. Passages 61 and 62 preferably have continuous walls surrounding the strut and may have various attachment means as described below.

Figure 5:
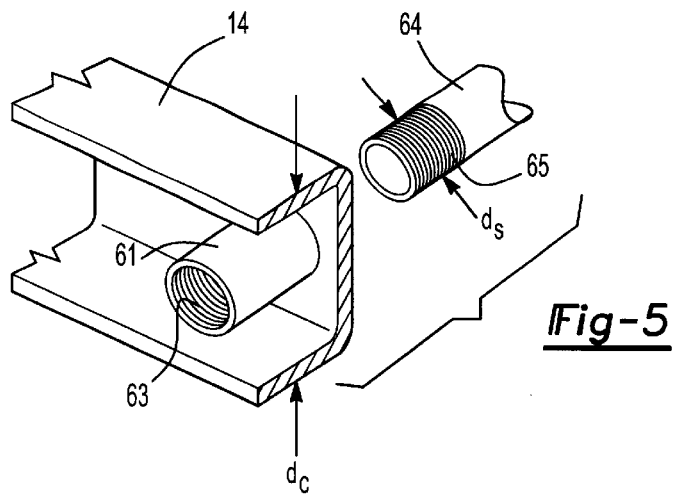
FIG. 5 is a partially cutaway, perspective view showing a passage in greater detail.

Referring to FIG. 5, front cross-member 14 is shown in partial section. Integral with cross-member 14 is passage 61 which has threads 63 on its interior side wall. A strut 64 is formed as a circular tube and has a threaded outside surface 65, the threads of which engage threads 63 after strut 64 is installed.

Cross-member 14 is a hollow tube (with a square cross-sectional shape in this embodiment) and has a cross-sectional diameter or width d which is the same as the cross-sectional diameter or width of all the side-rails and cross-members generally, over a majority of their lengths. Strut 64 has a diameter $d_s$ which stays approximately constant over its length and which is less than about one-half of diameter $d_c$. As a consequence of the structure of the present invention, the tension/compression struts provide an optimal combination of static and dynamic stiffness and significant weight reductions for the overall structure.

Figure 6:
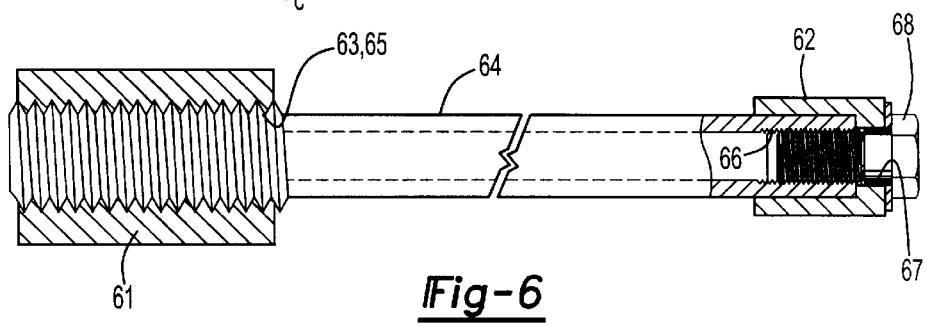
FIGS. 6–8 are each a partial cross section showing preferred embodiments of a strut attachment.

A preferred embodiment for affixing strut 64 to both passages 61 and 62 is shown in FIG. 6. Strut 64 has a maximum diameter at threads 65. The central portion and other end of strut 64 have a slightly reduced diameter allowing them to pass through passage 61. The other end is inserted into passage 62 for affixing at that second locus. The other end of strut 64 has internal threads 66. Strut 64 is screwed into passage 61 until the other end of strut 64 contacts a shoulder 67 at the end of passage 62. A slot (not shown) in the first end of strut 64 near passage 61 may be provided to facilitate turning of strut 64 to screw it into passage 61. Shoulder 67 creates a central opening which receives a bolt 68 for screwing into threads 66, thereby securing strut 64.

Figure 7:
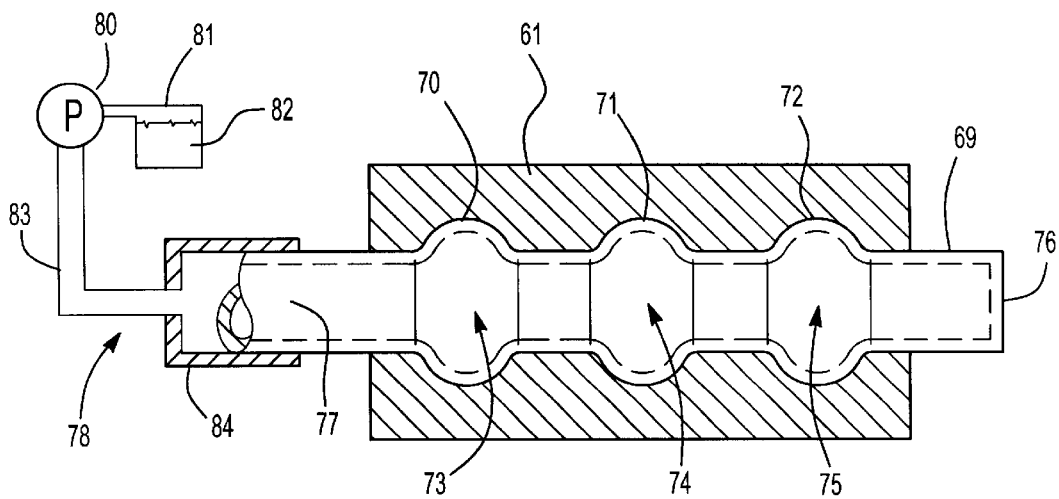

FIG. 7 shows an alternative embodiment for either or both of the passage connections. A strut 69 is received in passage 61 which includes pockets 70, 71, and 72. Originally, strut 69 has a substantially constant diameter along the portion of its length that is received inside passage 61. Strut 69 includes expansion areas 73, 74, and 75 which are expanded under pressure applied inside strut 69 in order to bulge the expansion areas into pockets 70, 71, and 72.

Strut 69 has a closed end 76 and an open end 77. Open end 77 is connected to a pressurization system 78 including a pump 80. A reservoir 81 contains a fluid 82 (which in a preferred embodiment is water). Pump 80 pumps fluid 82 into a high pressure line 83. A seal 84 couples high pressure line 83 with open end 77. By introducing pressurized fluid to the interior of strut 69, expansion areas 73, 74, and 75 fill pockets 70, 71, and 72, thereby creating stops against movement of strut 69. Once the stops are created, the pressure is released and the pressurization system removed.

Figure 8:
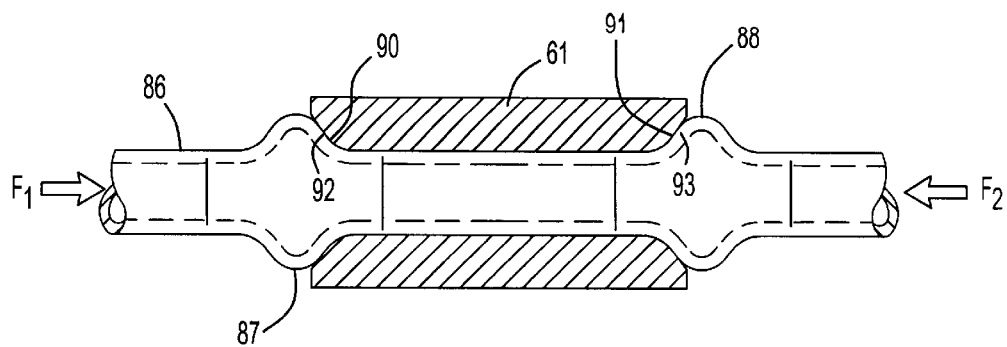

FIG. 8 shows an alternative embodiment for creating stops in situ when a strut is installed on the subframe. A strut 86 includes expansion areas 87 and 88. In this embodiment, expansion is achieved by the application of longitudinal forces $F_1$ and/or $F_2$ to strut 86 while passage 61 is immobilized. Bevels 90 and 91 may be used to facilitate formation of stops 92 and 93, respectively.

In view of the foregoing description, a cast aluminum subframe has been shown with improved stiffness through the use of tension/compression struts. Thus, the subframe achieves the advantages of low weight and high stiffness. Either a casting material of lower stiffness or a reduced thickness of casting material can be employed using the present invention since stiffness can be restored by the struts.

What is claimed is:

1. Frame apparatus for a vehicle, comprising:
   an aluminum subframe including a substantially hollow left side-rail, a substantially hollow right side-rail, a front cross-member, and a rear cross-member, wherein said substantially hollow side-rails and said cross-members each has a respective cross-sectional diameter over a majority of their respective lengths about equal to a first predetermined diameter; and
   a tension/compression strut element having a first end and a second end, said first and second ends being rigidly affixed between a first locus and a second locus on said cast aluminum subframe, said tension/compression strut element having a substantially straight body between said first and second ends and having a respective cross-sectional diameter over a majority of said substantially straight body about equal to a second predetermined diameter, said second predetermined diameter being less than about one-half of said first predetermined diameter,
   wherein said tension/compression strut element is comprised of a circular cross section at least at said first end, wherein said first end is threaded, and wherein said first end is attached by screwing to a first one of said side-rails or cross-members at said first locus.

2. The apparatus of claim 1 wherein a plurality of said tension/compression strut elements are provided, each having a first end and a second end, respectively, each respective first and second ends being affixed to respective loci on said cast aluminum subframe.

3. The apparatus of claim 1 wherein said tension/compression strut element is comprised of a hollow tube.

4. The apparatus of claim 1 wherein said tension/compression strut element is formed by a process selected from the group comprising stamping, forging, casting, and extruding.

5. The apparatus of claim 1 wherein said tension/compression strut element is formed of a material selected from the group comprising aluminum, aluminum alloy, and steel.

6. The apparatus of claim 1 wherein said first one of said side-rails or cross-members includes a threaded passage running through said first locus and receiving said threaded first end.

7. The apparatus of claim 6 wherein said first and second ends have first and second end diameters, respectively, and wherein said second end diameter is smaller than said first end diameter whereby said second end can pass through said threaded passage to approach a said second locus during installation of said tension/compression strut element.

8. The apparatus of claim 7 wherein said tension/compression strut element is comprised of a circular cross section at said second end and wherein said second end is threaded.

9. The apparatus of claim 8 wherein said second locus includes a threaded bore receiving said second end by screwing.

10. The apparatus of claim 8 wherein said threaded second end is comprised of interior threads and wherein said second end is bolted at said second locus.

11. The apparatus of claim 1 wherein said first locus is on one of said side-rails or said cross-members and wherein said second locus is on a different one of said side-rails or cross-members.

12. Frame apparatus for a vehicle, comprising:

an aluminum subframe including a substantially hollow left side-rail, a substantially hollow right side-rail, a front cross-member, and a rear cross-member; and a tension/compression strut element having a first end and a second end, said first and second ends being rigidly affixed between a first locus and a second locus on said cast aluminum subframe;

wherein said tension/compression strut element is comprised of a circular cross section at least at said first end, wherein said first end is threaded, and wherein said first end is attached by screwing to a first one of said side-rails or cross-members at said first locus.

13. The apparatus of claim 12 wherein a plurality of said tension/compression strut elements is provided, each having a first end and a second end, respectively, each respective first and second ends being affixed to respective loci on said cast aluminum subframe.

14. The apparatus of claim 12 wherein said tension/compression strut element is comprised of a hollow tube.

15. The apparatus of claim 12 wherein said tension/compression strut element is formed by a process selected from the group comprising stamping, forging, casting, and extruding.

16. The apparatus of claim 12 wherein said tension/compression strut element is formed of a material selected from the group comprising aluminum, aluminum alloy, and steel.

17. The apparatus of claim 12 wherein said first one of said side-rails or cross-members includes a threaded passage running through said first locus and receiving said threaded first end.

18. The apparatus of claim 17 wherein said first and second ends have first and second end diameters, respectively, and wherein said second end diameter is smaller than said first end diameter whereby said second end can pass through said threaded passage to approach a said second locus during installation of said tension/compression strut element.

19. The apparatus of claim 18 wherein said tension/compression strut element is comprised of a circular cross section at said second end and wherein said second end is threaded.

20. The apparatus of claim 19 wherein said second locus includes a threaded bore receiving said second end by screwing.

21. The apparatus of claim 19 wherein said threaded second end is comprised of interior threads and wherein said second end is bolted at said second locus.

22. The apparatus of claim 12 wherein said first locus is on one of said side-rails or said cross-members and wherein said second locus is on a different one of said side-rails or cross-members.

* * * * *